Aug. 23, 1966     W. KOHLHAGEN     3,268,752
SELF-STARTING SYNCHRONOUS REACTION MOTOR
Filed Nov. 20, 1963
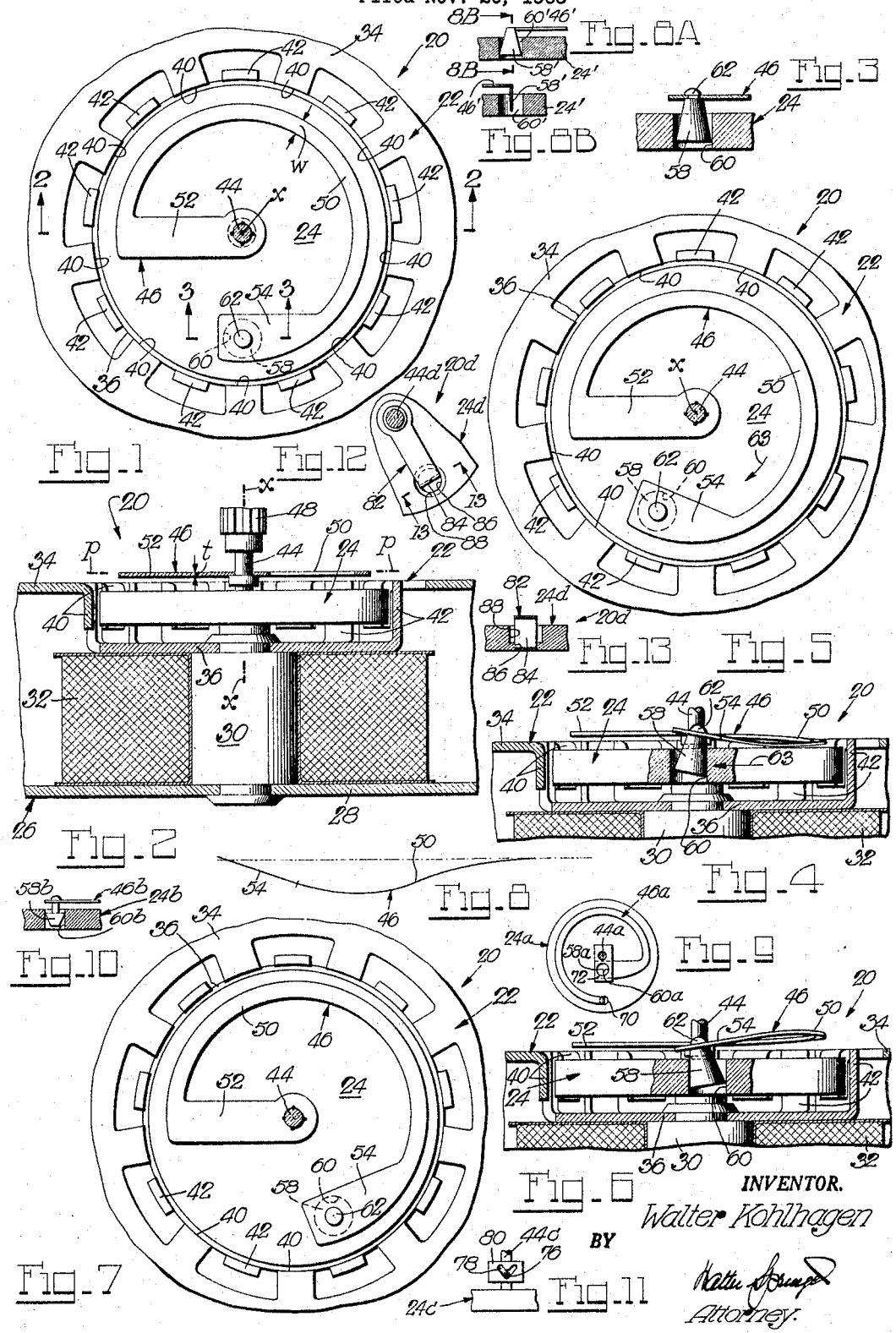
INVENTOR.
Walter Kohlhagen

United States Patent Office 3,268,752
Patented August 23, 1966

3,268,752
SELF-STARTING SYNCHRONOUS REACTION MOTOR
Walter Kohlhagen, Elgin, Ill., assignor to Amphenol-Borg Electronics Corporation, Broadview, Ill., a corporation of Delaware
Filed Nov. 20, 1963, Ser. No. 325,112
12 Claims. (Cl. 310—164)

This invention relates to synchronous motors in general, and to self-starting synchronous reaction motors in particular.

Motors of this type have a multi-polar field of which alternate poles are of opposite sign or polarity at any given instant and change their polarities in phase with an alternating current supplied to the associated field coil, and a permanent-magnet rotor the poles of which cooperate with the field poles in driving the rotor in synchronism with the alternation of the current. These motors are rendered self-starting by cordinating the rotor poles and field poles so that the rotor will on the first or subsequent polarizations of the field poles become unstable in any idle position and start in either direction. Since the motor is in most cases required to run in one certain direction, there is usually provided in the rotor to output-pinion drive thereof a directional drive control which functions to reverse this drive on a wrong-directional start of the rotor, and also acts as a stop against which the motor load, if spring-backed, will back up on interruption of the motor drive, or against which the motor load, if not self-backing, may immediately be backed on the slightest attempt of the rotor at a start in the wrong direction. These impediments to a rotor start in either direction, be it the motor load or the load-backing driving control, frequently deprive the rotor of the necessary freedom of motion to respond to the polarity changes of the field poles, with the result that the rotor will hang up in or near its idle position and thus fail to start. In an effort to prevent such starting failure of the motors, the rotor has been left loose on its shaft and there has been interposed between the rotor and its shaft a coupling spring which responds in gradual deflection to, and is overpowered by, the increasing starting urge and actual take-off of the rotor in either direction, with the coupling spring thus affording the rotor the relative freedom of motion necessary for a self-start despite the aforementioned impediments to a rotor start. However, while these prior coupling springs have alleviated starting failure of these motors, they have not largely eliminated such starting failure owing to occasional unfavorable circumstances with which they cannot cope, such as, for example, unfavorable idle positions of one and the same rotor in which its characteristic tremulous response to initial polarity changes of the field poles is so weak that its urge into sufficiently unstable condition for a self-start is effectively suppressed by even the slightest deflection of the coupling spring.

It is an object of the present invention to provide a motor of this type in which the coupling spring between the rotor shaft and the loose rotor thereon is such that its deflection on a motor start will to all practical intents and purposes have no suppressive effect on the starting urgency of the rotor so that the same will assuredly and quickly self-start from any idle position, and even the most unfavorable idle position, on the first few polarity changes of the field poles, yet the coupling spring must have fully adequate strength safely to transmit the rotor torque for the drive of even the maximum motor load which the optimum running torque of the rotor is capable to drive.

It is another object of the present invention to provide a motor of this type in which the coupling spring is arranged to respond to any and all deflective forces during a rotor start, or at least during a critical initial part thereof, in ready resilient flexure at which the stresses therein are far too weak effectively to interfere with the magnetic forces that urge and compel the rotor into a self-start from any, and even the most unfavorable, idle position, and to respond to the rotor drive of any, and even the maximum, motor load in resilient torsion at which the stresses therein ensuing from the torque transmission are within entirely permissible limits.

It is a further object of the present invention to provide a motor of this type in which the coupling spring is preferably and advantageously in the exceedingly simple form of a substantially flat, arcuate leaf spring which extends substantially in a plane normal to the rotor axis and is anchored with its ends to the rotor and rotor shaft, respectively, so that the spring will respond in resilient torsion to the rotor drive of a motor load, and there are provided on the spring and either on the rotor or rotor shaft, and preferably on the rotor, cam and follower parts which in the entire course of, or at least during a critical initial part, of a self-start of the rotor cooperate resiliently to flex the spring out of its normal plane.

A further object of the present invention is to provide a motor of this type in which one of the connections of the leaf-type coupling spring either with the rotor or with the rotor shaft, and preferably with the rotor, is formed by the aforementioned cam and follower parts for structural simplicity and optimum response of these parts to a rotor start.

Another object of the present invention is to provide a motor of this type in which the aforementioned cam and follower type connection of the leaf-type coupling spring either with the rotor or with the rotor shaft, and preferably with the rotor, is preferably such that the spring will in the course of a rotor self-start be resiliently flexed in S-fashion in which it has high recovery power. The coupling spring is thus adapted especially, though by no means exclusively, for rotors having on their peripheries a multitude of radially magnetized, closely adjacent pole faces of opposite polarities and, hence, relatively weak magnetic force, which on a motor stop are sufficiently attracted to field poles of opposite retentive polarity to compel these rotors into idle positions coincident, or nearly coincident, with their running positions of minimum reluctance. Thus, while the individual pole faces of these rotors are relatively weak magnets, the rotors are nevertheless powerful torque producers owing to the multitude of their pole faces, with the pole faces being further so arranged that the rotors will self-start from idle positions coincident, or nearly coincident, with their running positions of minimum reluctance. However, with the featured coupling spring recovering largely, if not entirely, from its S-flexure on a motor stop, the same will in many cases compel the rotor into an idle position displaced, more or less, from any of its running positions of minimum reluctance, with the rotor self-starting from this idle position with even greater assurance and vigor. Moreover, with the featured coupling spring recovering largely, if not entirely, from its S-flexure on a motor stop, the same is non-deflected, or nearly so, during a motor stop and, hence, will not interfere with the initially weak attempts of the rotor to start on reenergization of the field, so that the rotor will assuredly pass through this somewhat critical initial phase of its self-start and proceed to its full run.

Other objects and advantages will appear to those skilled in the art from the following, considered in conjunction with the accompanying drawings.

In the accompanying drawings, in which certain modes of carrying out the present invention are shown for illustrative purposes:

FIG. 1 is an enlarged fragmentary top view, partly in section, of a synchronous motor embodying the present invention;

FIG. 2 is a fragmentary section through the motor taken substantially on the line 2—2 of FIG. 1;

FIG. 3 is a fragmentary section along the line 3—3 of FIG. 1;

FIG. 4 is a fragmentary section through the motor similar to FIG. 2, but showing the motor in a certain operating condition;

FIG. 5 is a fragmentary top view of the motor similar to FIG. 1, but showing the motor in another operating condition;

FIG. 6 is a fragmentary section through the motor similar to FIGS. 2 and 4, put showing the motor in another different operating condition;

FIG. 7 is a fragmentary top view of the motor similar to FIGS. 1 and 5, but showing the motor in still another different operating condition;

FIG. 8 is a diagrammatic view of a certain prominent operating element, in action, of the motor;

FIG. 8A is a fragmentary section through a synchronous motor which embodies the present invention in a modified manner;

FIG. 8D is a section taken on the line 8B—8B of FIG. 8A;

FIG. 9 is a top view of part of a synchronous motor which embodies the present invention in another modified manner;

FIG. 10 is a fragmentary section through part of a synchronous motor which embodies the present invention in a further modified manner;

FIG. 11 is a fragmentary view, partly in section, of a synchronous motor which embodies the present invention in another modified manner;

FIG. 12 is a fragmentary view, partly in section, of a synchronous motor which embodies the present invention in still another modified manner; and FIG. 13 is a section taken on the line 13—13 of FIG. 12.

Referring to the drawings, and more particularly to FIGS. 1 and 2 thereof, the reference numeral 20 designates a synchronous motor having a field 22 and a rotor 24. The field 22 comprises, in this instance, a conventional field cup 26 to the bottom 28 of which is secured a center core 30, a field coil 32 in the field cup 26 and surrounding the core 30, and outer and inner field plates 34 and 36 which are suitably secured to the top of the field cup 26 and to the outer end of the center core 30, respectively. The outer and inner field plates 34 and 36 are provided with sets of inner and outer field poles 40 and 42, respectively, which are circularly arranged about a rotor axis $x$ and of which successive poles of one set alternate with successive poles of the other set in conventional manner.

Provided in the center core 30 is a preferably lubricated bearing (not shown) for a rotor shaft 44 which is turnable about the axis $x$ and on which the rotor 24 is loose so as to be turnable relative to the shaft 44. However, a resilient coupling spring 46 to-be-described drivingly connects the rotor 24 and shaft 44. The rotor shaft carries in this instance a pinion 48 which may directly drive a load or may be part of a first stage of any desired gear reduction (not shown). The rotor 24, which is a permanent magnet provided on its periphery with the customary series of pole faces of opposite polarities, respectively, may be entirely conventional, and is a self-starter by having its pole faces arranged in any of the known ways to that end.

In operation of the motor, alternating current is supplied to the field coil 32 to produce in the field poles 40 and 42 opposite instantaneous polarities which change in phase with the alternating current, with the pole faces of the rotor 24 cooperating with the field poles 40, 42 in driving the rotor in synchronism with the alternation of the current in a manner which is conventional with motors of this type.

As is well known, a self-start of the rotor on excitation of the field is impeded by any part of the motor load on the rotor. The part of the motor load to which the rotor is subjected on its self-start will vary with different load drive arrangements and other factors some of which are uncontrollable. In most motors of this type some provision is made whereby the rotor will be relieved of the motor load in toto or in part at least at the somewhat critical intitial state of its self-start, so that the motors will in general self-start. However, there are still all too frequent occasions when these motors experience starting failure owing to excessive load impediment at the time under various unfavorable circumstances. In an effort to overcome such starting failure of the motor, the rotors have been left loose on their shafts and there have been interposed between them spring couplings which, besides transmitting the rotor torque to the shafts, afford by virtue of their resiliency some measure of relative freedom to the rotors at their self-start. However, while these spring couplings have alleviated starting failure of the motors, they have not largely eliminated such starting failure. For example, one of the more prominent causes of still persisting starting failure of the motors is an occasional unfavorable idle position of one and the same rotor in which its characteristic tremulous response to initial polarity changes of the field poles is so weak that its urge into sufficiently unstable condition for a self-start is effectively suppressed by even the slightest deflection of the coupling spring. The present coupling spring is designed to render the rotors immune to the causes of still persisting starting failure of motors of this type.

In accordance with the present invention, the coupling spring 46 is designed and arranged in the motor to respond in ready resilient flexure to the slightest urge of the rotor toward and into a self-start without effectively impeding such rotor urge, with such flexure of the spring taking place on motion of the rotor, mostly relative to the rotor shaft with its load burden, over a range in which the rotor will almost invariably self-start and reach its full run by the time it assumes the full motor load or, on a wrong-directional start, is reversed into the right direction by a usually provided conventional directional drive control (not shown), or in which the rotor will in any event reach a sufficiently unstable condition for an assured self-start even on becoming confronted with the load burden on the rotor shaft. In thus arranging the coupling spring, the self-start of the rotor takes place with hardly ever any impediment from the motor load. The coupling spring 46 is further designed and arranged in the motor safely to transmit the full running torque of the rotor to its shaft for the drive of even a maximum motor load which the rotor is capable to drive, with the spring 46 responding to the torque transmission in resilient torsion.

The coupling spring 46 is, in the present instance, a leaf spring of suitable material, such as steel of adequate resiliency, which extends generally around the rotor shaft 44 and is at its ends connected with the rotor 24 and its shaft 44, respectively. The leaf spring 46, which is preferably substantially flat and extends around the rotor shaft over an angular distance which is preferably less than 360°, has a width $w$ (FIG. 1) which is larger than its thickness $t$ (FIG. 2), with the spring being further arranged so that the same will, in non-deflected condition, extend widthwise preferably substantially in a plane $p$ normal to the axis $x$ and preferably spaced from the adjacent face of the rotor 24 (FIG. 2). The leaf spring 46 has a resiliently distortable active length 50 which in this instance is part-circular and disposed concentrically with respect to the axis $x$, and end length 52 and 54 which preferably are resiliently non-distortable by making them in this instance of greater width than the active spring length 50. With the active spring length 50 being in this instance arranged concentrically with respect to the axis *x* and being preferably also considerably closer to the rotor periphery than to the rotor shaft 44 (FIG. 1), the resiliently non-distortable end length 52 of the leaf spring 46 extends arm-like inwardly, preferably radially, for the connection of the spring with or anchorage to the rotor shaft 44, with the arm 52 of the spring being to this end suitably secured to the rotor shaft 44, as by staking, for example.

The leaf spring 46 is at its other end connected with the rotor 24. In accordance with an additional aspect of the present invention, the connection of the spring 46 with the rotor is by way of cooperating cam and follower elements 58 and 60 which are to compel the spring 46 into resilient flexure on a self-start of the rotor. These cam and follower elements 58 and 60 are shown in the exemplary form of a frusto-conical stud on the spring and a preferably cylindrical aperture in the rotor, respectively, with the cam stud 58 projecting into the rotor aperture 60 (FIGS. 1 and 3). The cam stud 58, which is mounted, by riveting at 62, for instance, on the end length 54 of the spring, preferably at its free end, is in non-flexed condition of the spring coaxial with the rotor aperture 60 the axis of which is spaced from and parallel to the axis *x* (FIGS. 1 and 3). Furthermore, the cam stud 58 is received substantially fittingly in the rotor aperture 60 and extends for a considerable distance within the confines of the latter (FIG. 3). In the present instance also, the cam stud 58 is at its small end secured to the spring, with the large end thereof being in the rotor aperture 60.

Let it now be assumed that the motor is idle and A.C. current is reapplied to the field coil 32, the rotor 24 will respond to the initial polarity changes of the field poles in increasing tremulous fashion until it reaches a sufficiently unstable condition to take off in either direction. In the course of the rotor's self-start from its tremulous response to the polarity changes of the field poles to its actual take-off, the ensuing rotor motion is by way of the rotor aperture 60 against the cam stud 58 on the coupling spring 46 with resulting cooperation between the cam stud and rotor aperture in resiliently deflecting the spring 46 in the manner, but almost invariably less in extent than, shown either in FIG. 4 or in FIG. 6, depending on the momentary direction of the rotor motion. However, FIGS. 3, 4 and 6 indicate the ready manner in which the cam stud 58 and rotor aperture 60 cooperate in resiliently flexing the spring 46 on motion of the rotor during its self-starting phase relative to the then mostly immovable rotor shaft 44. Thus, with the rotor's momentary motion being in the direction of the arrow 63 in FIG. 4, for example, the responsive cooperation between cam stud 58 and rotor aperture 60 causes a tilt of the former to compel resilient flexure of the spring out of its normal plane and closer to the rotor 24. Conversely, with the rotor's momentary motion being in the opposite direction (FIG. 6), the responsive cooperation between cam stud 58 and rotor aperture 60 causes a tilt of the former to compel resilient flexure of the spring out of its normal plane and further away from the rotor. The spring 46 will, on a self-start of the rotor, thus be resiliently flexed from its non-deflected condition (FIG. 2) almost invariably to a lesser extent than shown in FIGS. 4 and 6, and will thus be flexed noticeably either in the direction in FIG. 4 or in the direction in FIG. 6, or in both directions. With the responsive resilient flexure of the spring 46 to a self-start of the rotor being thus of rather small magnitude, and with the thickness of the spring being kept at a permissible minimum for the required strength of the spring for its safe torque transmission for the drive of the motor load, the stresses in the spring thus flexed during any rotor start are so small that they will not effectively impede any phase of such rotor start, wherefore the rotor will unfailingly self-start under all, including the worst possible, starting conditions. This holds true despite the fact that the exemplary resiliently non-distortable end length 54 of the spring 46 serves as an action arm to amplify the flexure of the spring initiated by the cooperating cam stud 58 and rotor aperture 60.

Once the rotor has succeeded in taking off, the spring 46 will be resiliently flexed to the maximum extent provided in the design of the cam stud 58, either to the exemplary extent and in the manner shown in FIG. 4 or to the extent and in the manner shown in FIG. 6, depending on the direction in which the rotor takes off, with the spring 46 being in either case held against further flexure owing to the then full engagement of the periphery of the cam stud 58 with the wall of the rotor aperture 60 over its considerable extent in the latter which is adequate for the purpose.

In the arrangement of the cam stud 58 and rotor aperture 60 as shown, the motion of the rotor 46 to achieve maximum resilient flexure of the spring 46 is but a few degrees as evidenced by the relatively small angular displacement of the rotor aperture 60 in FIGS. 4 and 6 from its position in the preceding idle position of the rotor exactly midway between the rotor positions in FIGS. 4 and 6. Such comparatively small motion of the rotor for achieving maximum flexure of the spring 46 has been found to be entirely adequate for the purpose of assured self-starts of the rotor. However, it is a simple matter to arrange the cam stud and rotor aperture so that a larger motion of the rotor is required to bring about maximum flexure of the spring, if this is desired.

Assuming that the motor has a directional drive control and that the rotor 24 has taken off in the right direction (arrow 63 in FIGS. 4 and 5) and proceeded to the momentary position of maximum spring flexure in FIG. 4, the spring cannot flex beyond the maximum flexure shown for reasons already explained and, hence, is now confronted with the entire load on the rotor shaft. In consequence, the spring 46 now acts to transmit the rotor torque to the rotor shaft and its load, and in doing so becomes further deflected in resilient torsion fashion (FIG. 5) while remaining flexed substantially as in FIG. 4. The spring 46 thus remains under resilient flexure and torsion during the motor run. Conversely, if the rotor 24 should have taken off in the opposite, wrong, direction and proceeded to the momentary position of maximum spring flexure in FIG. 6, it will either drive the motor load until backed against the directional drive control, or simply strain to back the motor load with even greater force against the drive control if it is already backed thereagainst, with ensuing reversal of the drive of the motor load into the right direction. In either event, the spring 46 will, until drive reversal, act in resilient torsion in the manner shown in FIG. 7, and on reversal revert to resilient torsion in the manner shown in FIGS. 4 and 5 for the drive of the motor load in the right direction. Finally, on interruption of the current to the field coil 32, the motor will come to a stop, with the coupling spring recovering to its non-deflected condition (FIGS. 1 and 2). Of course, while the motor is running, the coupling spring 46 has also all the advantages of the prior coupling springs, such as absorbing most, if not all, irregularities of the characteristically erratic, though synchronous, rotor run for uniform drive of the motor load, for example.

It is an additional aspect of the present invention that the described operational tilting of the cam stud 58 on a rotor self-start has the effect of tilting the leaf spring 46 out of its normal plane in typical S-fashion as shown in FIGS. 4 and 6, and shown even clearer, but exaggerated, in the diagrammatic view of FIG. 8 in which the spring is shown as though drawn out linearly and viewed edgewise. Response of the spring 46 to a self-start of the rotor in S-flexure is preferable to response of the same in simple flexure because of the greater recovery power of an S-flexed spring. Thus, while on each reenergization of the field coil 32 the self-starting urge of the rotor 24 will easily bring about S-flexure of the spring 46 and will not be effectively impeded by such spring flexure, the S-flexed spring will, on a motor stop, have sufficient recovery power to return to, or nearly to, its non-deflected condition (FIG. 2) and thus be ready substantially fully to respond in resilient flexure to, and thereby enhance the reliability and also vigor of, the next self-start of the rotor. This holds true despite the usual magnetic urge of the rotor into one of a number of certain idle positions, which urge is in most cases counteracted by the recovering spring, but so that the spring will perform its designated function on each self-start of the rotor and the latter will self-start from any of its idle positions.

Flexure of the spring 46 in S-fashion on a self-start of the rotor and its relatively powerful recovery urgency into non-deflected condition on a motor stop is particularly advantageous if the rotor is of a type having on its periphery a multitude of radially magnetized, closely adjacent pole faces of opposite polarities and, hence, relatively weak magnetic force, which on a motor stop are sufficiently attracted to field poles of opposite retentive polarity to compel the rotor into idle positions coincident, or nearly coincident, with its running positions of minimum reluctance. Rotors of this type are shown in my copending application Serial No. 77,073, now Patent No. 3,149,256, filed December 19, 1960. While the individual pole faces of rotors of this type are relatively weak magnets, the rotors are nevertheless powerful torque producers owing to the multitude of their pole faces, with the pole faces being further so arranged that the rotors will self-start from idle positions coincident, or nearly coincident, with their running positions of minimum reluctance. However, with the spring 46 having relatively high recovery power from its S-flexure, the same will in many cases compel the rotor into idle positions displaced, more or less, from any of its running positions of minimum reluctance, with the rotor then self-starting from such idle positions with even greater assurance and vigor.

While in the described motor 20 the cam element 58 of the coupling spring 46 is a frusto-conical stud on the latter, FIGS. 8A and 8B show this cam element 58′ to be a flat tongue integral with, and bent out of the plane of, the coupling spring 46′, with the cam tongue 58′ being trapezoidal in outline (FIG. 8A) so as to act in the same identical manner as the frusto-conical cam stud 58 on the coupling spring 46. To this end, the tongue 58′ extends in a plane which is substantially normal to the plane of the spring 46′ and also to a plane which radiates from the axis of the rotor 24′ and intersects the tongue substantially midway thereof, with the tongue 58′ being received substantially fittingly in an aperture 60′ in the rotor which may be a cylindrical hole as shown, or may be a rectangular slot. The spring 46′ and tongue 58′ may thus advantageously be blanked and formed in a single piece.

While in the described motor 20 the cam and follower elements 58, 60 also form the preferred connection of the coupling spring 46 with the rotor 24, these cam and follower elements may be arranged so that they form the connection of the coupling spring with the rotor shaft. Thus, FIG. 9 shows a modified rotor-to-rotor shaft drive of which the coupling spring 46a is at one end firmly connected at 70 with the rotor 24a and carries at its other end a frusto-conical cam stud 58a which is fittingly received in a substantially cylindrical aperture 60a in an arm 72 on the rotor shaft 44a. Further, while in the described motor 20 the cam stud 58 projects with its large end into the rotor aperture 60 (FIG. 3), it is entirely feasible to invert this cam stud in the manner shown in FIG. 10 in which the cam stud 58b on the spring 46b is thus inverted and projects into the aperture 60b of the rotor 24b. Finally, while response of the coupling spring to a self-start of the rotor in S-like flexure is preferred, it is within the purview of the present invention to arrange cooperating cam and follower elements, either on the rotor or the rotor shaft and on the nearest spring end, in several self-evident ways so that the spring will respond in simple resilient flexure to a rotor self-start and continue in additional resilient torsion on the drive of the motor load. This may be achieved, for example, in the manner shown in FIG. 11 in which one end of the coupling spring (not shown) is firmly connected with the rotor 24c and its other end has a finger 76 which projects into a V-shaped groove 78 in a fixed collar 80 on the rotor shaft 44c.

Reference is finally had to FIGS. 12 and 13 which show a motor 20d in which the coupling spring 82 between the rotor 24d and the rotor shaft 44d responds in torsion quite readily to a self-start of the rotor, and which responds in torsion of greater magnitude to varying torque transmission during normal rotor drive. The spring 82 is a leaf spring arranged like a radial arm which at its inner end is anchored to the rotor shaft 44d and at its outer end has a bent finger 84 which with its free end projects with some slight clearance into a hole 86 in the rotor which is throughout its remainder counterbored at 88. On a self-start of the rotor, the spring finger 84 and hole 86 in the rotor will have a cam action which tilts the spring finger out of alignment with the axis of the hole 86 and thus causes the spring 82 to respond quite readily in torsion out of its normal plane in non-deflected condition, while during the normal rotor drive the spring 82 will act in torsion, i.e., widthwise deflection, of greater magnitude to smoothen the drive of the rotor, as will be readily understood.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a synchronous motor, the combination with a field having two sets of field poles arranged circularly about an axis and being of opposite instantaneous polarities on excitation of the field, a shaft element turnable about said axis, and a permanent-magnet rotor element loose on said shaft element and having two series of pole faces of opposite polarities cooperating with said field poles, of a spring on one side of and spaced from said rotor element connected at its ends with said elements to act as a resilient coupling between them, with said spring extending about said shaft element so as to act in resilient torsion on the drive of said shaft element by said rotor element; and cam and follower parts of which one part is carried by said spring and the other part is carried by one of said elements, with said parts cooperating to compel said spring from non-deflected condition into resilient S-like flexure on relative rotation between said elements through a certain angular distance, so that on the drive of said shaft element by said rotor element said spring remains in its S-like flexure.

2. In a synchronous motor, the combination with a field having two sets of field poles arranged circularly about an axis and being of opposite instantaneous polarities on excitation of the field, a shaft element turnable about said axis, and a permanent-magnet rotor element loose on said shaft element and having two series of pole faces of opposite polarities cooperating with said field poles, of a leaf spring on one side of and spaced from said rotor element and connected at its ends with said elements to act as a resilient coupling between them, with said spring extending around said shaft element and in non-deflected condition lying substantially in a plane normal to said axis so as to act in resilient torsion on the drive of said shaft element by said rotor element; and cam and follower parts of which one part is carried by said spring and the other part is carried by one of said elements, with said parts cooperating to compel said spring from nondeflected condition into resilient S-like flexure on relative rotation between said elements through a certain angular distance, so that on the drive of said shaft element by said rotor element said spring remains in its S-like flexure.

3. The combination in a synchronous motor as set forth in claim 2, in which said spring extends substantially circularly about said axis for less than 360 angular degrees and has at one end a radially inwardly extending and resiliently nondistortable arm by which it is connected with said shaft element, with said cam and follower parts being remote from said arm.

4. The combination in a synchronous motor as set forth in claim 2, in which said one part is carried by said spring at one end thereof, and said spring is connected with said one element through said parts.

5. In a synchronous motor, the combination with a field having two sets of field poles arranged circularly about an axis and being of opposite instantaneous polarities on excitation of the field, a shaft element turnable about said axis, and a permanent-magnet rotor element loose on said shaft element and having two series of pole faces of opposite polarities cooperating with said field poles, of a substantially flat leaf spring of greater width than thickness located on one side of and spaced from said rotor element and connected at its ends with said elements to act as a resilient coupling between them, with said spring extending around said shaft element and lying widthwise substantially in a plane normal to said axis so as to act in resilient torsion on the drive of said shaft element by said rotor element; and a first frusto-conical part and second associated part with a substantially cylindrical aperture of which one part is provided on one of said elements and the other part is provided on the one end of the spring connected with said one element, said first part and aperture being normally coaxial with each other and extending with their axes spaced from and parallel to that of said one element, said first part being substantially fittingly received in said aperture and extending within the confines of the latter sufficiently to cooperate therewith in compelling said spring from nondeflected condition into resilient S-like flexure on relative rotation between said elements, and said parts constituting the connection of said spring with said one element.

6. The combination in a synchronous motor as set forth in claim 5, in which an end length of said spring extending to said one end thereof is resiliently non-distortable to serve as an action arm for amplified S-like flexure of said spring.

7. In a synchronous motor, the combination with a field having two sets of field poles arranged circularly about a first axis and being of opposite instantaneous polarities on excitation of the field, a shaft element turnable about said axis, and a permanent-magnet rotor element loose on said shaft element and having two series of pole faces of opposite polarities cooperating with said field poles, of a substantially flat leaf spring of greater width than thickness located on one side of and spaced from said rotor element and connected at its ends with said elements to act as a resilient coupling between them, with said spring extending around said shaft element and lying widthwise substantially in a plane normal to said axis so as to act in resilient torsion on the drive of said shaft element by said rotor element; and a frusto-conical cam stud carried by said spring at one end thereof, one of said elements to which said one spring end is connected having a substantially cylindrical aperture with its axis spaced from and parallel to said first axis, said cam stud being substantially fittingly received in said aperture and normally coaxial therewith and extending within the confines of said aperture sufficiently to cooperate therewith in compelling said spring from nondeflected condition into resilient S-like flexure on relative rotation between said elements, and said cam stud and aperture constituting the connection of said spring with said one element.

8. The combination in a ysnchronous motor as set forth in claim 7, in which said aperture is provided in said rotor element.

9. The combination in a synchronous motor as set forth in claim 7, in which the smaller end of said cam stud is nearest said spring.

10. The combination in a synchronous motor as set forth in claim 7, in which an end length of said spring extending to said one end thereof is resiliently non-distortable to serve as an action arm for amplified S-like flexure of said spring.

11. The combination in a synchronous motor as set forth in claim 7, in which an intermediate resiliently distortable length of said spring and a continuing resiliently non-distortable first end length thereof extending to said one spring end extend substantially circularly about said axis for less than 360 angular degrees, and the remaining end length of said spring is resiliently non-distortable and extends radially inwardly for its connection with said shaft element, said aperture is provided in said rotor element and said first end length of said spring serves an action arm for amplified S-like flexure of said spring.

12. In a synchronous motor, the combination with a field having two sets of field poles arranged circularly about an axis and being of opposite instantaneous polarities on excitation of the field, a shaft element turnable about said axis, and a permanent-magnet rotor element loose on said shaft element and having two series of pole faces of opposite polarities cooperating with said field poles, of a leaf-type spring on one side of and spaced from said rotor element connected at its ends with said elements to act as a resilient coupling between them, said spring being substantially straight and extending with its inner end radially from said shaft element and in its non-deflected condition lying widthwise substantially in a plane transverse to said axis; and cam and follower parts of which one part is carried by said spring at its outer end and the other part is carried by said rotor element and said parts connect said spring with said rotor element, with said parts cooperating resiliently to twist said spring from nondeflected condition out of said plane into an initial deflected condition on relative rotation between said elements through a certain angular distance, and said spring in said initial deflected condition responding in resilient widthwise deflection to torque of varying magnitude transmitted from said rotor element to said shaft element.

References Cited by the Examiner

UNITED STATES PATENTS 2,788,455  4/1957  Kohlhagen _____ 310—41

MILTON O. HIRSHFIELD, *Primary Examiner.*

L. L. SMITH, *Assistant Examiner.*